United States Patent
Hiwara et al.

[11] Patent Number: 6,166,100
[45] Date of Patent: Dec. 26, 2000

[54] CATIONICALLY POLYMERIZABLE PIGMENTED COMPOSITION

[75] Inventors: Noriko Hiwara; Kenji Seko, both of Kanagawa-ken; Yoshiyuki Yukawa, Hiratsuka; Michitomo Kato, Hiratsuka; Takeshi Matuda, Hiratsuka, all of Japan

[73] Assignee: Kansai Paint Co., Ltd., Amagasaki, Japan

[21] Appl. No.: 09/358,418

[22] Filed: Jul. 22, 1999

[30] Foreign Application Priority Data

Jul. 22, 1998 [JP] Japan .................................. 10-205972
Sep. 16, 1998 [JP] Japan .................................. 10-261064

[51] Int. Cl.[7] .............................. C08F 2/48; C09D 11/00
[52] U.S. Cl. .............................. 522/110; 522/81; 522/71; 522/80; 522/79; 522/78; 522/75; 522/153; 522/111; 522/112; 522/129; 522/168; 522/170; 522/149; 106/31.6; 106/31.66
[58] Field of Search ..................... 522/100, 153, 522/111, 75, 112, 71, 110, 78, 129, 79, 168, 80, 81, 170, 149, 150; 106/31.6, 31.66

[56] References Cited

U.S. PATENT DOCUMENTS

| | | | |
|---|---|---|---|
| 4,076,536 | 2/1978 | Schlesinger et al. | 96/75 |
| 4,252,593 | 2/1981 | Green | 156/231 |
| 4,816,496 | 3/1989 | Wada et al. | 522/17 |
| 5,399,604 | 3/1995 | Sano et al. | 524/356 |
| 5,882,842 | 3/1999 | Araki et al. | 430/280.1 |
| 5,882,843 | 3/1999 | Kudo et al. | 430/285.1 |

OTHER PUBLICATIONS

Benyi, G et al. Improved Film Forming Composition for paints. Abstract for patent #HU47624.

*Primary Examiner*—James J. Seidleck
*Assistant Examiner*—Sanza L. McClendon
*Attorney, Agent, or Firm*—Fisher, Christen & Sabol

[57] ABSTRACT

A cationically polymerizable pigmented composition comprising (A) a cationically polymerizable binder component containing at least one resin or compound selected from the group consisting of (A-1) a cationically polymerizable acrylic resin consisting of a copolymer of (a) a (meth) acrylic ester monomer having $C_{6-31}$ aliphatic hydrocarbon group, (b) a polymerizable unsaturated monomer containing a polymerizable unsaturated group and at least one cationically polymerizable moiety selected from the group consisting of an epoxy group and an oxetane ring, and optionally (c) other polymerizable unsaturated monomer, and (A-2) a fatty acid-modified epoxy compound containing $C_{6-32}$ aliphatic hydrocarbon group and epoxy group, (B) a cationic polymerization initiator initiating polymerization by irradiation or heating, and (C) a color pigment.

10 Claims, No Drawings

CATIONICALLY POLYMERIZABLE PIGMENTED COMPOSITION

BACKGROUND OF THE INVENTION (1) Field of the Invention

The Present invention relates to a cationically polymerizable pigmented composition showing good properties in pigment dispersibility, flowability, color development properties and curing properties.

(2) Description of the Background Art

A cationically polymerizable pigmented composition containing an epoxy compound as a binder component has been known in the art. However, the above composition has such drawbacks that since the epoxy compound shows high polarity, a color pigment, particularly an organic color pigment shows poor wettability, and the color pigment shows poor dispersibility, that a pigmented composition obtained therefrom shows poor flowability and the color pigment contained in the pigmented composition shows poor color development properties, and that coating of the composition onto a substrate results cissing and poor coating film appearance.

On the other hand, for the purpose of improving dispersibility of the color pigment, attempts on dispersing the color pigment have been made by use of a color pigment-dispersing resin free of a cationically polymerizable group such as an epoxy group, resulting in that a pigmented composition obtained therefrom shows poor curing properties, because the color pigment-dispersing resin does not have cationically polymerizable properties.

SUMMARY OF THE INVENTION

It is an object of the present invention to provide a cationically polymerizable pigmented composition showing good properties in pigment dispersibility, flowability, color development properties and curing properties without developing drawbacks such as cissing on coating onto a substrate.

It is another object of the present invention to provide a cationically polymerizable pigmented composition showing good properties in pigment dispersibility, flowability, color development properties and curing properties, and capable of providing good coating film appearance on coating onto a substrate.

That is, the present invention provides a cationically polymerizable pigmented composition comprising (A) a cationically polymerizable binder component containing at least one resin or compound selected from the group consisting of (A-1) a cationically polymerizable acrylic resin consisting of a copolymer of (a) a (meth)acrylic ester monomer having $C_{6-31}$ aliphatic hydrocarbon group, (b) a polymerizable unsaturated monomer containing a polymerizable unsaturated group and at least one cationically polymerizable moiety selected from the group consisting of an epoxy group and an oxetane ring, and optionally (c) other polymerizable unsaturated monomer, and (A-2) a fatty acid-modified epoxy compound containing $C_{6-32}$ aliphatic hydrocarbon group and epoxy group, (B) a cationic polymerization initiator initiating polymerization by irradiation or heating, and (C) a color pigment.

DETAILED DESCRIPTION OF THE INVENTION

The cationically polymerizable pigmented composition of the present invention is a pigmented composition to be cured by cationic polymerization due to irradiation of light such as ultraviolet light or heating.

The cationically polymerizable binder component (A) in the composition of the present invention is a binder component capable of being cured by cationic polymerization due to irradiation of light such as ultraviolet light or heating and, in a first embodiment, contains, as an essential component, a cationically polymerizable acrylic resin (A-1) consisting of a copolymer of (a) a (meth)acrylic ester monomer having $C_{6-31}$ aliphatic hydrocarbon group, (b) a polymerizable unsaturated monomer containing a polymerizable unsaturated group and at least one cationically polymerizable moiety selected from the group consisting of an epoxy group and an oxetane ring, and optionally (c) other polymerizable unsaturated monomer.

The (meth)acrylic ester monomer (a) having $C_{6-31}$ aliphatic hydrocarbon group (hereinafter may be referred to as monomer (a)) is a monomer having $C_{6-31}$, preferably $C_{8-18}$ aliphatic hydrocarbon group in the molecule. Specific examples may include 2-ethylhexyl (meth)acrylate, isooctyl (meth)acrylate, isodecyl (meth)acrylate, n-lauryl (meth)acrylate, tridecyl (meth)acrylate, isomyristyl (meth)acrylate, n-stearyl (meth)acrylate, isostearyl (meth) acrylate and the like. In the present invention, "(meth) acrylate" means "acrylate" or "methacrylate".

The polymerizable unsaturated monomer (b) [hereinafter it may be referred to as monomer (b)] containing the polymerizable unsaturated monomer and the cationically polymerizable moiety selected from the group consisting of the epoxy group and the oxetane ring may include, for example, a monomer (b-1) containing the polymerizable unsaturated monomer and the epoxy group [hereinafter may be referred to as an epoxy monomer (b-1)], a monomer (b-2) containing the polymerizable unsaturated monomer and the oxetane ring [hereinafter referred to as an oxetane monomer (b-2)], etc.

Specific examples of the epoxy monomer (b-1) may include (methyl)glycidyl group-containing polymerizable unsaturated monomers such as glycidyl (meth)acrylate, methylglycidyl (meth)aorylate, allylglycidyl ether and the like; alicyclic epoxy group-containing polymerizable unsaturated monomers such as 3, 4-epoxycyclohexylmethyl (meth)acrylate and the like, and the like.

Examples of the oxetane monomer (b-2) may include a compound represented by the following general formula (1):

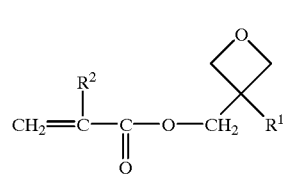

(1)

where $R^1$ represents an alkyl group having 1 to 6 carbon atoms, and $R^2$ represents hydrogen atom or methyl group; a compound prepared by reacting a hydroxyl group-containing oxetane such as 3-ethyl-3-hydroxymethyl oxetane with an unsaturated monomer such as 2-isocyanatoethyl (meth) acrylate, m-isopropenyl-α,α-dimethylbenzyl isocyanate, methyl (meth)acrylate and the like, containing a functional group such as isocyanate group, methyl ester group and the like, which reacts with the hydroxyl group and does not react with the oxetane ring, and an ethylenically unsaturated group such as acryloyl group, methacryloyl group, vinyl group and the like; and the like.

Of the oxetane monomer (b-2), the compound represented by the above general formula (1) is preferred and may include, for example, 3-(acryloyloxymethyl)3-methyloxetane, 3-(methacryloyloxymethyl)3-methyloxetane, 3-(acryloyloxymethyl)3-ethyloxetane, 3-(methacryloyloxymethyl)3-ethyloxetane, 3-(acryloyloxymethyl)3-butyloxetane, 3-(methacryloyloxymethy 1)3-butyloxetane, 3-(acryloyloxymethyl)3-hexyloxetane, 3-(methacryloyloxymethyl)3-hexyloxetane and the like.

Examples of other polymerizable unsaturated monomer (c) [hereinafter referred to as a monomer (c)] may include $C_{1-5}$ alkyl (meth)acrylate such as methyl (meth)acrylate, ethyl (meth)acrylate, n-propyl (meth)acrylate, isopropyl (meth) acrylate, n-butyl (meth)acrylate, isobutyl (meth) acrylate, tert-butyl (meth)acrylate and the like; monoesterified products between polyhydric alcohol and acrylic acid or methacrylic acid, for example, 2-hydroxyethyl (meth) acrylate, hydroxypropyl (meth)acrylate, 2,3-dihydroxybutyl (meth)acrylate, 4-hydroxybutyl (meth)acrylate, polyethylene glycol mono(meth)acrylate, and the like; a hydroxyl group-containing monomer such as a compound prepared by ring opening polymerization of ε-caprolactone with the monoesterified product between the polyhydric alcohol and acrylic acid or methacrylic acid; carboxyl group-containing polymerizable unsaturated monomer such as acrylic acid, methacrylic acid, maleic acid, maleic anhydride and the like; aminoalkyl (meth)acrylate such as N,N-dimethylaminoethyl (meth)acrylate, N,N-diethylaminoethyl (meth)acrylate, N,N-dimethylaminoethyl (meth)acrylate, and the like; (meth)acrylamide or derivatives thereof such as acrylamide, methacrylamide, N,N-dimethylaminoethyl (meth) acrylamide, N,N-diethylaminoethyl (meth)acrylamide, N,N-dimethylaminopropyl (meth)acrylamide, N-methylol acrylamide, N-methylol acrylamide methyl ether, N-methylol acrylamide butyl ether and the like; styrene, acrylonitrile, methacrylonitrile, vinyl acetate and the like. These compounds may be used alone or in combination. In the present invention, "(meth)acrylamide" means "acrylamide" or "methaorylamide".

The cationically polymerizable acrylic resin (A-1) may be prepared, for example, by subjecting a monomer mixture of the monomers (a), (b) and optionally (c) to radical polymerization in the presence of a radical polymerization initiator, in an organic solvent or in other cationically polymerizable compound.

The organic solvent may include any inactive organic solvents which do not react with the monomer (a), (b) or (c). Specific examples thereof may include aromatic solvents such as toluene, xylene and the like; acetate solvents such as amyl acetate, propyl acetate, butyl acetate, ethyl acetoacetate, 2-ethoxyethyl acetate, diethyleme glycol monomethyl ether acetate and the like; ether solvents such as dioxane, ethylene glycol diethyl ether and the like; ketone solvents such as acetone, methyl ethyl ketone, methyl isobutyl ketone and the like; and the like.

The above other cationically polymerizable compound used on the radical polymerization of the monomer mixture is not subjected to the radical polymerization reaction as in the above organic solvent and added so as to reduce viscosity in a polymerization system, resulting in smoothly proceeding the polymerization reaction. Therefore, other cationically polymerizable compounds to be added on the above radical polymerization may preferably include compounds which have a low viscosity and have no radical polymerization reactivity, and are capable of forming a binder component other than the cationically polymerizable acrylic resin (A-1) in the cationically polymerizable binder component of the present invention, and more preferably may include low viscosity epoxy group-containing compounds and low viscosity oxetance ring-containing compounds having a viscosity of 500 cps or less at 70° C. respectively.

The above radical polymerization initiator used in the preparation of the cationically polymerizable acrylic resin (A-1) may include any known radical polymerization initiators without any special limitations, but specifically may include, for example, peroxides such as benzoyl peroxide, di-t-butyl hydroperoxide, t-butyl hydroperoxide, cumyl peroxide, cumene hydroperoxide, diisopropyl benzene hydroperoxide, t-butyl peroxybenzoate, lauryl peroxide, acetyl peroxide, t-butyl peroxy-2-ethylhexanoate, tert-amylperoxy-2-ethylhexanoate, 1,1,3,3-tetramethylbutyl-peroxy-ethylhexanoate and the like; azo compounds such as 2,2'-azobisisobutylonitrile, 2,2'-azobis-2-methylbutylonitrile, azobisdimethylvaleronitrile, azobiscyclohexane carbonitrile and the like; and the like. These may be used alone or in combination.

The above radical polymerization reaction may be carried out without special limitations, but usually may be carried out at a temperature range of about 50 to 200° C., preferably about 70 to 150° C. for about one to 24 hours, preferably about 5 to 10 hours.

The cationically polymerizable acrylic resin (A-1) preferably has a number average molecular weight of 300 to 200,000, preferably 500 to 100,000, more preferably 2,000 to 50,000 from the standpoints of curing properties and coating workability, and also has spoxy group and/or oxetane ring in an amount of one or more, preferably 2 to 100 on an average as a total amount of epoxy group and oxetane ring, more preferably 2 to 50 on an average per one molecule respectively. In the case where the cationically polymerizable acrylic resin (A-1) has epoxy group only as the cationically polymerizable moiety, an epoxy equicalent is in the range of 130 to 15,000, preferably 140 to 7,000, in the case of oxetane ring only, an oxetane ring equivalent is in the range of 130 to 15,000, preferably 140 to 7,000, and in the case where the resin (A-1) has both epoxy group and oxetane ring as the cationically polymerizable moiety, and both epoxy group and oxetane ring are regarded one group, a group equivalent is in the range of 130 to 15,000, preferably 140 to 7,000 from the standpoints of curing properties, control of volume shrinkage on curing, surface appearance of a cured product, etc.

Mixing amounts of the monomers (a), (b) and (c) in the cationically polymerizable acrylic resin (A-1) are such that the monomer (a) is in the range of 5 to 95% by weight, preferably 10 to 70% by weight, the monomer (b) is in the range of 5 to 95% by weight, preferably 20 to 70% by weight, and the monomer (c) is in the range of 0 to 90% by weight, preferably 10 to 50% by weight from the standpoints of curing properties, pigment dispersibility, coating workability and the like.

The cationically polymerizable binder component (A) in the composition of the present invention contains the cationically polymerizable acrylic resin (A-1) as an essential component, but may contain other cationically polymerizable compound (A-3) as an optional component. Other cationically polymerizable compound (A-3) may include the following compounds (i), (ii), (iii), (iv) and (v).

(i) Epoxy Compound:

The epoxy compound (i) may include compounds having at least one epoxy group in one molecule and preferably an epoxy equivalent of 70 to 5,000, preferably 80 to 3,000, and typically include, for example, dicyclopentadiene dioxide, (3,4-epoxy-cyclohexyl) methyl-3,4-epoxycyclohexane carboxylate, bis(2,3-epoxycyclopentyl) ether, bis(3,4-epoxycyclohexylmethyl) adipate, bis(3,4-epoxy-6-methylcyclohexyl-methyl) adipate, (3,4-epoxy-6-methyl-cyclohexyl)methyl-3,4-epoxy-6-methyl-cyclohexane carboxylate, bis(3,4-epoxycyclohexylmethyl) acetal, bis(3, 4-epoxycyclohexyl) ether of ethylene glycol, 3,4-epoxycyclohexane carboxylic diester of ethylene glycol, (3,4-epoxycyclohexyl) methyl alcohol, (3,4-epoxycyclohexyl) ethyltrimethoxysilane, 3-ethyl-3-(3,4-epoxycyclohexylmethyl) oxymethyloxetane, Epolead GT300 (Trade name, trifunctional alicyclic epoxy resin, marketed by Daicel Chemical Industries, Ltd.), Epolead GT400 (Trade name, tetrafunctional alicyclic eposy resin, marketed by Daicel Chemical Industries, Ltd.), EHPE (Trade name, polyfunctional alicyclic epoxy resin, marketed by Daicel Chemical Industries, Ltd.), compounds represented by the following formulas:

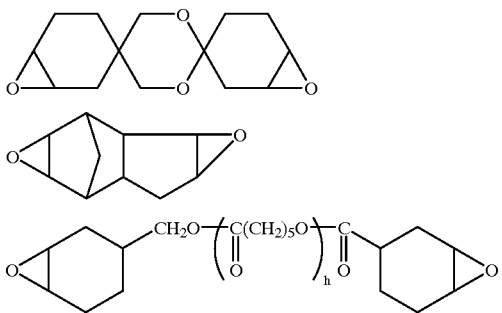

where h is an integer of one or more,

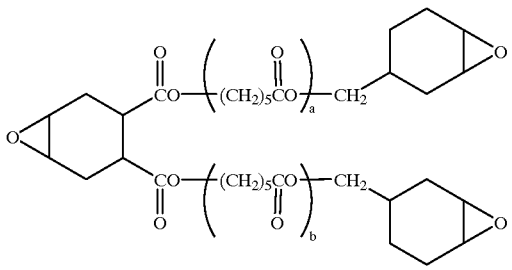

where a and b are an integer of 0 or more respectively,

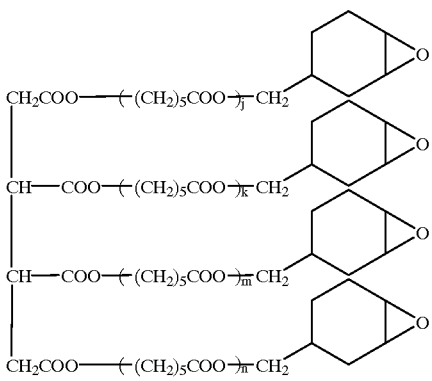

where j, k, m and n are an integer of 0 or more respectively,

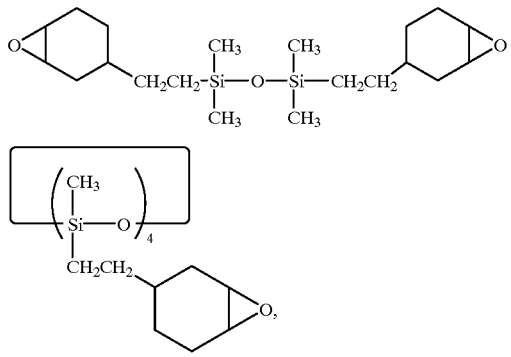

alicyclic epoxy group-containing epoxy compounds such as alicyclic epoxy group-containing (co)polymers prepared by (co) polymerizing alicyclic epoxy group-containing ethylenically unsaturated monomer such as 3,4-epoxycyclohexylmethyl methacrylate, and optionally other polymerizable unsaturated monomer; aliphatic epoxy group-containing epoxy compounds such as ethylene glycol diglycidyl ether, propylene glycol diglycidyl ether, polyethylene glycol diglycidyl ether, polypropylene glycol diglycidyl ether, 1,4-butanediol diglycidyl ether, neopentyl glycol diglycidyl ether, 1,6-hexanediol diglycidyl ether, glycerin diglycidyl ether, diglycerin tetraglycidyl ether, trimethylolpropane triglycidyl ether, spiro-glycol diglycidyl ether, 2,6-diglycidylphenyl ether, sorbitol polyglycidyl ether, triglycidyl isocyanurate, bisphenol A diglycidyl ether, butadiene dioxide, phthalic diglycidyl ester, 3-ethyl-3-glycidyl-oxymethyl oxetane, bisphenol type epoxy resin, ε-caprolactone-modified bisphenol type epoxy resin, phenolic novolac type epoxy resin, cresol-movolac type epoxy resibn, glycidyl group-containing (co)polymer prepared by (co)polymerizing a glycidyl group-containing ethylenically unsaturated monomer such as glycidyl (meth) acrylate and the like, and optionally other polymerizable unsaturated monomer, and the like; epoxy compounds containing alicyclic epoxy group and aliphatic epoxy group, for example, (co)polymers containing alicyclic epoxy group and glycidyl group and prepared by (co)polymerizing an alicyclic epoxy group-containing ethylenically unsaturated monomer such as vinyl cyclohexene dioxide, limonene dioxide, 3,4-epoxycyclohexylmethyl (meth)acrylate and the like, and optionally polymerizable unsaturated monomer; and the like.

(ii) Vinyl Compounds:

The vinyl compound (ii) is a compound having vinyl group, and may include, for example, aromatic vinyl compounds such as styrene, α-methylstyrene, p-chloromethylistyrene, vinyl toluene and the like; saturated or unsaturated alkyl vinyl ethers such as n-butyl vinyl ether, isobutyl vinyl ether, cyclohexyl vinyl ether, hydroxybutyl vinyl ether and the like; alkenyl vinyl ethers such as allyl vinyl ether, ethenyl vinyl ether, 1-methyl-2-propenyl vinyl ether and the like; aryl vinyl ethers such as phenyl vinyl ether, p-methoxyphenyl vinyl ether and the like; alkyl divinyl ethers such as butanediol divinyl ether, triethylene glycol divinyl ether, oyclohexanediol divinyl ether and the like; aralkyl divinyl ethers such as 1,4-benzene dimethanol divinyl ether, N-m-chlorophenyl diethanolamine divinyl ether, m-phenylene bis(ethylene glycol) divinyl ether and the like; aryl divinyl ethers such as hydroquinone divinyl ether, resorcinol divinyl ether and the like; cationically polymerizable nitrogen-containing compounds such as N-vinylcarbazole, N-vinylpyrrolidone and the like; and the like.

(iii) Bicycloorthoester Compounds:

The bicycloorthoester compound (iii) may include, for example, 1-phenyl-4-ethyl-2,6,7-trioxabicyclo-[2,2,2]-octane, 1-ethyl-4-hydroxymethyl-2,6,7-trioxabicyclo-[2,2,2]-octane and the like.

(iv) Spiroorthocarbonate Compounds:

The spiroorthocarbonate compound (iv) may include, for example, 1,5,7,11-tetraoxaspiro-[5,5]-undecane, 3,9-dibenzyl-1,5,7,11-tetraoxaspiro-[5,5]-undecane, 1,4,6-trioxaspiro-[4,4]-nonane, 1,4,6-trioxaspiro-[4,5]-decane, and the like.

(v) Oxetane Compounds:

The oxetane compound (v) is a compound containing at least one oxetane ring represented by the following formula:

in the molacule, and may include, for example, compounds represented by the above general formula (1), compounds represented by the following general formula (2):

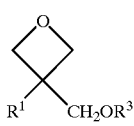

(2)

where $R^1$ is as defined above, and $R^3$ represents hydrogen atom, alkyl group having 1 to 6 carbon atoms, alkylene group, hydroxyalkyl group, alkoxyalkyl group having 2 to 10 carbon atoms and substituted or unsubstituted with hydroxyl group, aryl group having 7 to 12 carbon atoms and substituted or unsubstituted with hydroxyl group, aralkyl group and aryloxyalkyl group; and compounds represented by the following general formula (3):

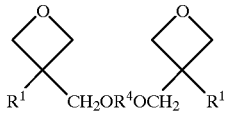

(3)

where two $R^1$s are same or different and are as defined above, and $R^4$ represents alkylene group having 1 to 6 carbon atoms, cycloalkylene group, phenylene group, xylylene group and polyalkyleneoxy group having 4 to 30 carbon atoms.

Typical examples of the oxetane compound represented by the above general formula (1) may include 3-(acryloyloxymethyl)3-ethyloxetane, 3-(methacryloyloxymethyl) 3-ethyloxetane and the like.

Typical examples of the oxetane compound represented by the above general formula (2) may include 3-ethyl-3-methoxymethyloxetane, 3-ethyl-3-ethoxymethyloxetane, 3-ethyl-3-buthoxymethyloxetane, 3-ethyl-3-hexyloxymethyloxetane, 3-methyl-3-hydroxymethyloxetane, 3-ethyl-3-hydroxymethyloxetane, 3-ethyl-3-allyloxymethyloxetane, 3-ethyl-3-(2'-hydroxyethyl)oxymethyl oxetane, 3-ethyl-3-(2'-hydroxy-3'-phenoxypropyl)oxymethyl oxetane, 3-ethyl-3-(2'-hydroxy-3'-buthoxypropyl)oxymethyl oxetane, 3-ethyl-3-[2'-(2"-ethoxyethyl)oxymethyl] oxetane, 3-ethyl-3-(2'-buthoxyethyl)oxymethyl oxetane, 3-ethyl-3-benzyloxymethyl oxetane, 3-ethyl-3-(p-tert-butylbenzyl-oxymethyl) oxetane and the like.

Typical examples of the oxetane compound represented by the above general formula (3) may include, for example, such compounds that both R's are ethyl group and $R^4$ is methylene, ethylene, propylene, butylene, cyclohexylene, phenylene, xylylene group, poly(ethyleneoxy) group, and poly(propyleneoxy) group.

In addition to the compounds represented by the above general formulas (1), (2) and (3), the oxetane compound (v) may also include, for example, bis (3-ethyloxetanyl-3-methyl) oxide; oxetane ring-containing copolymers prepared by copolymerizing a compound represented by the above general formula (1) and containing polymerizable unsaturated group and oxetane ring, for example, 3-ethyl-3-(acryloyloxymethyl) oxetane as a monomer component with other polymerizable unsaturated monomer, and the like. Other polymerizable unsaturated monomer used in the above copolymerization may include the same monomer as other polymerizable unsaturated monomer (c) used in the preparation of the above cationically polymerizable acrylic resin (A-1).

Other cationically polymerizable compound (A-3) may preferably include the epoxy compound (i) and the oxetane compound (v) from the standpoints of physical properties and curing properties of a cured product.

The cationically polymerizable binder component (A) in the composition of the present invention, in the first embodiment, may include the cationically polymerizable acrylic resin (A-1) only, but preferably further includes other cationically polymerizable compound (A-3) too. A mixing ratio of the cationically polymerizable acrylic resin (A-1) to other cationically polymerizable compound (A-3) is such that the former is preferably in the range of 10 to 90% by weight, more preferably 20 to 80% by weight, and the latter is preferably in the range of 10 to 90% by weight, more preferably 20 to 80% by weight based on a total amount thereof.

The cationically polymerizable binder component (A) in the composition of the present invention contains, in a second embodiment, a fatty acid-modified epoxy compound (A-2) as an essential component.

The fatty acid-modified epoxy compound (A-2) is an epoxy ester compound containing at least one aliphatic hydrocarbon group having 6 to 32, preferably 7 to 24 carbon atoms and at least one epoxy group in one molecule and prepared by partly modifying epoxy groups of an epoxy compound with a fatty acid. In the present specification, "aliphatic hydrocarbon group" means an aliphatic hydrocarbon group corresponding to a moiety remaining after removing carboxyl group from the fatty acid.

The fatty acid used in the preparation of the fatty acid-modified epoxy compound (A-2) may include saturated or unsaturated fatty acid having 7 to 33, preferably 8 to 25 carbon atoms, and preferably, for example, saturated fatty acid such as caprylic acid, pelargonic acid, isononoic acid, capric acid, Versatic-acid (Trade name, marketed by Shell Chemical Co.), lauric acid, myristic acid, palmitic acid, stearic acid, arachic acid, behenic acid, cerotic acid, montanic acid, melissic acid and the like; unsaturated fatty acid such as caprolaic acid, undecylenic acid, sorbic acid, oleic acid, linoleic acid, linolenic acid, eleostearic acid, cetoleic acid, erucic acid, licanic acid, ricinoleic acid, arachidonic acid and the like, and the like. These may be used alone or in combination. The above fatty acid may be prepared from animal oil and vegetable oil, for example, fish oil fatty acid, coconut oil fatty acid, castor oil fatty acid, rice bran oil fatty acid, soybean oil fatty acid, tall oil fatty acid, safflower oil fatty acid, linseed oil fatty acid, high-diene oil fatty acid, cottonseed oil fatty acid, dehydrated castor oil fatty acid, olive oil fatty acid, colza oil fatty acid, sesame oil fatty acid, perilla oil fatty acid, hempseed oil fatty acid, grapestone oil fatty acid, corn oil fatty acid, sunflower oil fatty acid, walnut oil fatty acid, rubberseed oil fatty acid, oiticica oil fatty acid and the like.

The epoxy compound used in the preparation of the fatty acid-modified epoxy compound (A-2) may include an epoxy compound having 2 or more, preferably 2 to 10 of epoxy group in one molecule and having a number average molecular weight preferably in the range of 140 to 2,000 from the standpoints of handling workability and pigment dispersibility of the resulting fatty acid-modified epoxy compound (A-2), etc.

The epoxy group contained in the above epoxy compound may include alicyclic epoxy group having cyclohexene oxide or cyclopentene oxide structure or the like, aliphatic epoxy group such as glycidyl group and the like, and mixtures thereof.

Examples of the above alicyclic epoxy group-containing epoxy compound may include examples of the alicyclic epoxy group-containing epoxy compound used in the epoxy compound (i) of other cationically polymerizable compound (A-3), except for (3,4-epoxy cyclohexyl) methyl alcohol, (3,4-epoxycyclohexyl) ethyltrimethoxysilane and 3-ethyl-3-(3,4-epoxy cyclohexylmethyl) oxymethyl oxetane.

Examples of the aliphatic epoxy group-containing epoxy compound may include examples of the aliphatic epoxy group-containing epoxy compound used in the epoxy compound (i) of other cationically polymerizable compound (A-3), except for 3-ethyl-3-glycidyloxymethyl oxetane.

Examples of the epoxy compound containing the alicyclic epoxy group and aliphatic epoxy group may include examples of the epoxy compound containing alicyclic epoxy group and aliphatic epoxy group used in the epoxy compound (i) of other cationically polymerizable compound (A-3).

In the copolymer as the epoxy compound, which is the alicyclic epoxy group-containing copolymer, the glycidyl group-containing copolymer, or the copolymer containing alicyclic epoxy group and glycidyl group, other polymerizable unsaturated monomer copolymerizable with an epoxy group-containing ethylenically unsaturated monomer include the examples of the monomer (c) used in the preparation of the cationically polymerizable acrylic resin (A-1), and compounds having oxetane rings and ethylenically unsaturated group in the molecule, for example, 3-acryloyloxymethyl-3-ethyl oxetane, 3-methacryloyloxymethyl-3-ethyl oxetane, a compound prepared by reacting a hydroxyl group-containing oxetane such as 3-ethyl-3-hydroxymethyl oxetane with an unsaturated monomer such as 2-isocyanatoethyl (meth)acrylate, m-isopropenyl-α,α-dimethylbenzyl isocyanate, methyl (meth)acrylate and the like, and containing a functional group such as isocyanato group, methyl ester group and the like, which reacts with the hydroxyl group and does not react with the oxetane ring, and an ethylenically unsaturated group such as acryloyl group, methacryloyl group, vinyl group and the like; and the like. These compounds may be used alone or in combination. In the present invention, "(meth) acrylamide" means "acrylamide or methacrylamide".

The fatty acid-modified epoxy compound (A-2) may be prepared, for example, by reacting the fatty acid with the epoxy compound at such a mixing ratio that an equivalent ratio of carboxyl group in the fatty acid to epoxy group in the epoxy compound is in the range of 1:1.2 to 1:30, preferably 1:1.3 to 1:20 from the standpoints of curing properties, pigment dispersibility, handling workability, etc. of the resulting fatty acid-modified epoxy compound. The above equivalent ratio is preferably in the range of 1:1.5 to 1:6 when the epoxy compound has two epoxy groups, 1:1.4 to 1:7 when three epoxy groups, and 1:1.3 to 1:8 when four epoxy groups respectively.

The reaction between the fatty acid and the epoxy compound may preferably be carried out in the presence of a catalyst known per se and capable of promoting an addition reaction epoxy group with carboxyl group. The reaction temperature is preferably in the range of 70 to 180° C., preferably 100 to 140° C. from the standpoints of a reaction velocity and control of by products. Examples of the catalyst may include a tertiary amine, quatanary ammonium salt, quaternary phosphonium salt, stannous octoate and the like. The catalyst may preferably be used in an amount of 3% by weight or less, preferably 0.01 to 1(one) % by weight based on a weight of a total solid content of the fatty acid and the epoxy compound. Too much amounts of the catalyst may reduce curing properties of the fatty acid-modified epoxy compound (A-2).

In the case where the fatty acid or the epoxy compound used in the above reaction is solid or has a high viscosity at normal temperature, a solvent such as toluene, xylene, methyl ethyl ketone, methyl isobutyl ketone and the like may be used to dissolve the fatty acid or the epoxy compound. The solvent used as above may preferably be removed by a vacuum distillation or the like after the completion of the reaction, otherwise may be removed from a coating film by heating or the like on coating the composition of the present invention.

A reaction product of the above reaction may include a mixture of the fatty acid-modified epoxy compound (A-2), unreacted epoxy compound, and, as the case may be, a compound formed by esterifying all of the epoxy group in the epoxy compound with the fatty acid.

The fatty acid-modified epoxy compound (A-2) prepared as above preferably has a number average molecular weight of 250 to 5,000, preferably 280 to 4,000, and an epoxy equivalent of 250 to 5,000, preferably 280 to 4,000 from the standpoints of curing properties, pigment dispersibility, handling workability, etc.

The cationically polymerizable binder component (A) contains, in a second embodiment, the fatty-acid modified epoxy compound as an essential components, but may contain, as an optional component, the aforementioned other cationically polymerizable compound (A-3).

The cationically polymerizable binder component (A) in the composition of the present invention, in the second embodiment, may include the fatty-acid-modified epoxy compound (A-2) only, but preferably further includes other cationically polymerizable compound (A-3) too. A mixing ratio of the fatty acid-modified epoxy compound (A-2) to other cationically polymerizable compound (A-3) is such that the former is preferably in the range of 10 to 90% by weight, more preferably 20 to 80% by weight, and the latter is preferably in the range of 10 to 90% by weight, more preferably 20 to 80% by weight based on a total amount thereof.

The cationically polymerizable binder component (A) in the composition of the present invention contains, in the third embodiment, the aforementioned cationically polymerizable acrylic resin (A-1) and the fatty acid-modified epoxy compound (A-2), as essential components.

The mixing ratio of the cationically polymerizable acrylic resin (A-1) and the fatty acid-modified epoxy compound (A-2) is not restricted. The cationically polymerizable binder component (A) in the composition of the present invention, in the third embodiment, may include the cationically polymerizable acrylic resin (A-1) and the fatty acid-modified epoxy compound (A-2) only, but preferably further includes other cationically polymerizable compound (A-3) too. A mixing ratio of the total of the acrylic resin (A-1) and the epoxy compound (A-2) to other cationically polymerizable compound (A-3) is such that the former is preferably in the range of 10 to 90% by weight, more preferably 20 to 80% by weight, and the latter is preferably in the range of 10 to 90% by weight, more preferably 20 to 80% by weight based on a total amount thereof.

Cationic Polymerization Initiator (B)

The cationic polymerization initiator (B) is added for promoting a cationic polymerization of a cationically polymerizable group such as epoxy group, oxetane group or the like, contained in the binder component (A) of the composition of the present invention due to irradiation of light such as ultraviolet light or heating, resulting in smoothly proceeding curing. The cationic polymerization initiator (B) may include a cationic polymerization initiator forming a substance, for example, an acid capable of initiating cationic polymjerization due to irradiation of light such as ultraviolet light or heating.

Examples of the cationic polymerization initiator (B) may include compounds represented by the following formulas:

where Ar represents aryl group such as phenyl group, $X^-$ represents $BF_4^-$, $PF_6^-$, $SbF_5(OH)^-$, $SbF_6^-$, $AsF_6^-$ or a group represented by the following formula:

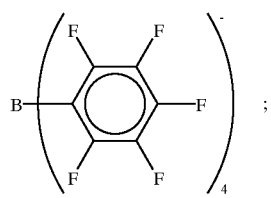

(4)

where Ar and $X^-$ are as defined above;

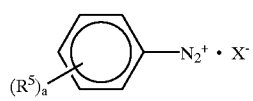

where $R^5$ represents alky group having 1 to 12 carbon atoms or alkoxyl group having 1 to 12 carbon atoms, n is an integer of 0 to 3, $X^-$ is as defined above;

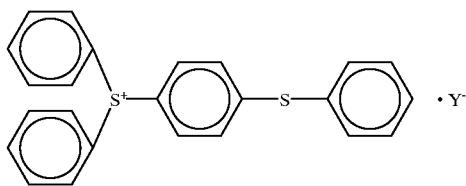

where $Y^-$ represents $PF_6^-$, $SbF_6^-$, $AsF_6^-$ or $SbF_5(OH)^-$;

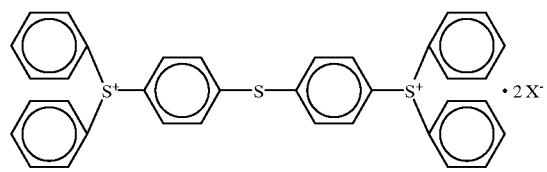

where $X^-$ is as defined above;

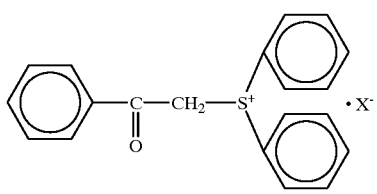

where $X^{31}$ is as defined above;

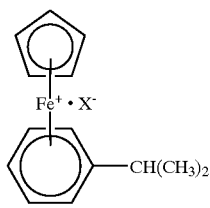

where $X^-$ is as defined above;

(5)

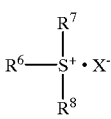

where $R^6$ represents aralkyl group having 7 to 15 carbon atoms or alkenyl group having 3 to 9 carbon atoms, $R^7$ represents hydrocarbon group or hydroxyphenyl group having 1 to 7 carbon atoms respectively, $R^8$ represents alkyl group having 1 to 5 carbon atoms and containing or not containing oxygen atom or sulfur atom, $X^-$ is as defined above;

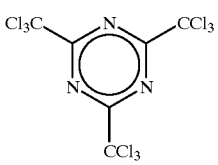

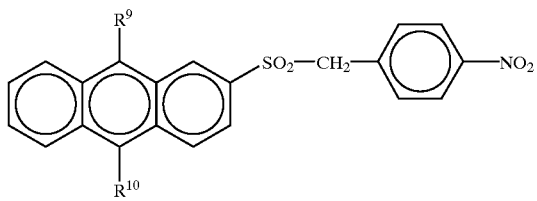

where R⁹ and R¹⁰ independently represent alkyl group having 1 to 12 carbon atoms or alkoxyl group having 1 to 12 carbon atoms;

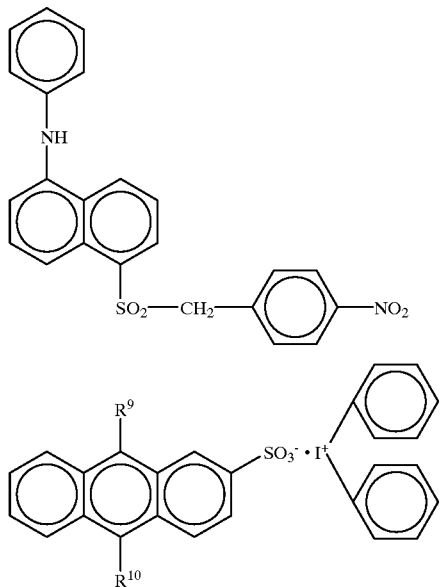

where R⁹ and R¹⁰ are as defined above;

(6)

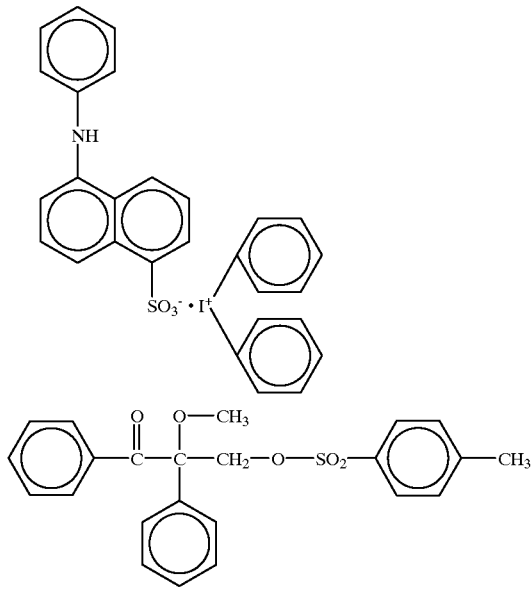

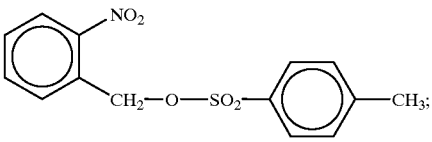

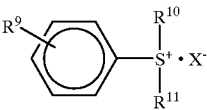

where R⁹, R¹⁰ and R¹¹ independently represent alkyl group having 1 to 12 carbon atoms or alkoxyl group having 1 to 12 carbon atoms, X⁻ is as defined above;

(7)

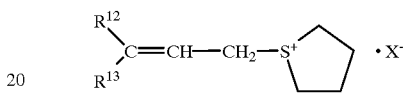

where R¹² and R¹³ independently represent hydrogen atom, alkyl group having 1 to 12 carbon atoms or alkoxyl group having 1 to 12 carbon atoms, X⁻ is as defined above; mixtures of Ar₃Si—OOH with aluminum chelate, where Ar is as defined above.

In addition to the above cationic polymerization initiators, the cationic polymerization initiator (B) may also include boron trifluoride, tetraethylammonium bromide and the like. These cationic polymerization initiators may be used alone or in combination. Cationic thermopolymerization initiators may be combined with cationic photopolymerization initiators to be used.

Of the above cationic polymerization initiators, the cationic thermopolymerization initiator may preferably include aromatic sulfonium salts represented by the above formulas (4), (5) and (6).

Specific examples of the acromatic sulfonium salt may include benzyl-4-hydroxyphenylmethylsulfonium-hexafluoroantimonate, benzyl-4-hydroxyphenylmethylsulfonium hexafluorophosphate, 4-acetoxyphenylbenzylmethyl-sulfonium hexafluoroantimonate, 4-acetoxyphenyldimethylsulfonium-hexafluoroantimonate, benzyl-4-methoxyphenylmethylsulfonium hexafluoroantimonate, benzyl-2-methyl-4-hydroxyphenylmethyl-sulfonium hexafluoroantimonate, benzyl-3-chloro-4-hydroxyphenylmethylsulfonium hexafluoroarsenate, benzyl-3-methyl-4-hydroxy-5-tert-butylphenylmethylsulfonium hexafluoroantimonate, 4-methoxybenzyl-4-hydroxyphenyl methylsulfonium hexafluorophosphate, dibenzyl-4-hydroxyphenylsulfonium hexafluoroantimonate, dibenzyl-4-hydroxyphenylsulfonium hexafluorophosphate, 4-acetoxyphenyldibenzylsulfonium hexafluoroantimonate, dibenzyl-4-methoxyphenylsulfonium hexafluoroantimonate, nitrobenzyl-4-hydroxyphenylmethylsulfonium hexafluoroantimonate, 3,5-dinitrobenzyl-4-hydroxyphenylmethylsulfonium hexafluoroantimonate, β-naphthylmethyl-4-hydroxyphenylmethyl sulfonium hexafluoroantimonate and the like.

Examples of commercially available aromatic sulfonium salts may include Sanaid SI-L85, SI-L110, SI-L145, SI-L160, SI-H15, SI-H20, SI-H25, SI-H40, SI-H50, SI-60L, SI-80L, SI-100L, SI-110L, SI-180L, SI-80 and SI-100 (Trade names, all marketed by Sanshin Chemical Ind. Co., Ltd.).

Examples of commercially available cationic photopolymerization initiators may include Cyracure UVI-6970, UVI- 6974 and UVI-6990 (Trade names, all marketed by Union Carbide Co., Ltd., USA), Irgacure 261 and 264 (Trade names, all marketed by Ciba Speciality Chemicals Co., Ltd.), CIT-1682 (Trade name, marketed by Nippon Soda Co., Ltd.), BBI-102 (Trade name, marketed by Midori Kagaku Co., Ltd.), Adekaoptomer SP-150 and SP-170 (Trade names, all marketed by Asahi Denka Kogyo K.K.), and the like.

Some of the cationic polymerization initiators function as the cationic photopolymerization initiator and as the cationic thermopolymerization initiator too, and are capable of initiating cationic polymerization by radiation of light and by heating too.

A mixing amount of the cationic polymerization initiator (B) is usually in the range of 0.01 to 20 parts by weight, preferably 0.05 to 15 parts by weight, more preferably 0.1 to 10 parts by weight based on 100 parts by weight of the cationically polymerizable binder component (A) from the standpoints of curing properties, storage stability, fabricating properties of a cured product, finished appearance and the like.

Color Pigment (C)

The color pigment (C) used in the composition of the present invention may include color pigments usually used in the fields of the coating composition and printing, and may include, for example, white pigments such as titanium white, zinc oxide and the like; blue pigments such as cyanine blue, indanthrene blue and the like; green pigments such as cyanine green, verdigris and the like; organic red pigments such as azo series, quinacridone series and the like; inorganic red pigments such as red iron oxide and the like; organic yellow pigments such as benzimidazoline series, isoindolinone series, isoindoline series, quinophthalone series and the like; inorganic yellow pigments such as titanium yellow, chrome yellow and the like; black pigments such as carbon black, graphite, vegetable black and the like; glitter pigments such as aluminum powder, copper powder, nickel powder, titanium dioxide-coated mica powder, iron oxide-coated mica powder, glitter graphite and the like, and the like.

The color pigment (C) may preferably include neutral or acidic color pigments, and may also include color pigments triated so as to provide a neutral or acidic surface, without inhibiting cationic polymerization.

A mixing amount of the color pigment (C) used in the composition of the present invention is preferably in the range of 1 to 500 parts by weight, preferably 10 to 300 parts by weight based on 100 parts by weight of the cationically polymerizable binder component (A).

The cationically polymerizable pigmented composition of the present invention contains, as essential components, the cationically polymerizable binder component (A), the cationic polymerization initiator (B) and the color pigment (C), and may contain, as optional components, a binder component not having cationically polymerizable properties, polymerization promotor, filler, pigment-dispersing agent, flowability controling agent, leveling agent, anti-foaming agent, light stabilizer, anti-oxidant, thermopolymerization inhibitor, lubricating properties-imparting agent such as wax, and the like.

The binder component not having cationically polymerizable properties may include, for example, a compound which may be by produced on preparing the fatty acid-modified epoxy compound (A-2) by reaction of the epoxy compound with the fatty acid so that the fatty acid may be added to all of the epoxy groups in the epoxy compound, resulting in forming a compound not having epoxy group.

The binder component not having cationically polymerizable properties may also be used for the purpose of, for example, improving viscosity of the composition, physical properties and adhesion properties of a cured product, and the like, and may include acrylic resin, polyester resin, rosin-modified phenolic resin, rosin-modified alkyd resin, ketone resin and the like. A mixing amount of the binder component not having cationically polymerizable properties preferably is in the range of 20 parts by weight or less based on 100 parts by weight of the cationically polymerizable binder component (A) from the standpoints of curing properties, etc. The polymerization promotor optionally used in the composition of the present invention may include, for example, alkylphosphine series such as triphenylphosphine and the like, thioethers such as β-thiodiglycol and the like. These may be used alone or in combination.

The color pigment (C) used in the composition of the present invention is required to be uniformly dispersed in the composition so as to suffiniciently exhibit a coloring power. Dispersion of the color pigment (C) may be carried out by subjecting the color pigment (C) and the cationically polymerizable acrylic resin (A-1) or the fatty acid-modified epoxy compound (A-2), and optionally other components, for example, other cationically polymerizable compound (A-3), organic solvent, the binder component not having cationically polymerizable properties and the like, to pigment dispersion by use of a dispersion mixer such as a three-roll mill, ball mill, sand mill, attritor or the like. The resulting pigment dispersion may optionally be mixed with other component used in the composition to obtain a cationically polymerizable pigmented composition of the present invention.

The cationically polymerizable pigmented composition obtained as above may suitably be applicable to the coating composition, ink, adhesive, resist material and the like.

The composition of the present invention is applicable to paper, plastics, metals, glass, wood materials and substrates combined therewith. For example, the composition of the present invention may be coated onto the surface of these substrates so as to be a cured film thickness in the range of 1 to 50 μm, preferably 2 to 30 μm, followed by irradiating light or heating to be cured.

Coating may be carried out by a coating or printing method, for example, a roll coater coating, spray coating, brushing, bar coater coating, roller coating, screen printing, platen press, rotary press and the like.

The composition of the present invention may be cured by irradiation of light in the case where a cationic photopolymerization initiator is contained as the cationic polymerization initiator, and may be cured by heating in the case where a cationic thermopolymerization initiator is contained.

On curing the composition coated as above by irradiation of light, in the case where the composition of the present invention contains a solvent, irradiation of ultraviolet light or the like may preferably be carried out after the solvent has been removed by heating or the like. Conditions of irradiation of light may arbitrarily be varied depending on kinds of coated compositions, coating film thickness and the like, but are such that a wave length of the light to be irradiated is suitably in the range of 200 to 450 nm, and an irradiation source having a wave length with high sensitivity may suitably be used depending on kinds of cationic photopolymerization initiators. Examples of sources of the irradiation of light such as ultraviolet light or the like may include high pressure mercury vapor lamp, ultra high pressure mercury vapor lamp, xenon lamp, carbon arc, metal halide lamp, sunlight and the like. An irradiation dose is suitably in the range of 10 to 2000 mj/cm$^2$, preferably 50 to 1000 mj/cm$^2$. As the case may be, the above irradiation of light may preferably be followed by heating, resulting in promoting curing, making possible relaxation of stress-strain in a cured product, and in improving hardness and adhesion properties of a coating film. The above heating may be carried out under the conditions of a surrounding temperature in the range 150 to 400° C. for 5 second to 30 minutes.

In the case where the coated composition of the present invention is cured by heating in place of the irradiation of light, the above heating is suitably carried out at a surrounding temperature in the range of 80 to 200° C. for 30 seconds to 5 hours.

The present invention makes it possible to provide a cationically polymerizable pigmented composition showing good properties in pigment dispersibility, flowability, color development properties and curing properties without developing drawbacks such as cissing on coating onto a substrate.

The present invention also makes it possible to provide a cationically polymerizable pigmented composition showing good properties in pigment dispersibility, flowability, color development properties and curing properties, and capable of providing good coating film appearance on coating onto a substrate.

EXAMPLE

The present invention will be explained more in detail by the following Examples, but should not be limited thereto. Hereinafter, "part" and "%" are by weight respectively.

Preparation of Cationically Polymerizable Acrylic Resin

Preparation Examples 1–6

A reactor equipped with a thermometer, thermostat, stirrer, reflux condenser and dropping apparatus was charged with 50 parts of toluene, followed by heating up to 110° C. while introducing nitrogen gas, dropping thereinto a mixed solution of the monomers and 2,2'-azobis (2-methylbutylonitr ile) as a polymerization initiator as shown in the following Table 1 from the above dropping apparatus over 3 hours. The completion of the dropping procedure was followed by aging at 110° C. for 2 hours to complete the reaction. Thereafter, the interior of the reactor was vacuumed by use of a vacuum pump to remove the toluene solvent, resulting in obtaining cationically polymerizable acrylic resins (d) to (g). Glass transition temperatures measured by a differential scanning calorimeter (DSC), number average molecular weights measured by the gel permeation chromatography (GPC) and average numbers of epoxy group and oxetane ring contained in one molecule respectively are shown in the following Table 1. Preparation Examples 5 and 6 are for comparison.

TABLE 1

| | | | Preparation Examples | | | | | |
|---|---|---|---|---|---|---|---|---|
| | | | 1 | 2 | 3 | 4 | 5 | 6 |
| Monomer Composition | (a) | isodeoyl methacrylate | 60 | | | | | |
| | | n-lauryl methacrylate | | 30 | | | | |
| | | isostearyl acrylate | | | 20 | 30 | | |
| | (b) | 3,4-epoxy cyclohexyl methacrylate | | 20 | 50 | | 30 | |
| | | glycidyl methacrylate | 30 | | | | 40 | 30 |
| | | 3-methacryloxymethyl 3-ethyl oxetane | | 30 | | 50 | | 30 |
| | (c) | styrene | 10 | | | 10 | 10 | 10 |
| | | methyl methacrylate | | | 20 | | 10 | |
| | | n-butyl acrylate | | 10 | | 10 | | 30 |
| | | 2-hydroxypropyl acrylate | | 10 | 10 | | 10 | |
| 2,2'-azobis (2-methylbutylonitrile) | | | 8 | 4 | 0.5 | 2 | 8 | 4 |
| Cationically polymerizable acrylic resin | | | d | e | f | g | h | i |
| Property Value | | resin solid content (%) | 100 | 100 | 100 | 100 | 100 | 100 |
| | | glass transitison temperature (° C.) | 15 | 7 | 65 | 15 | 20 | 40 |
| | | number average molecular weight | 5,000 | 8,000 | 40,000 | 11,000 | 4,000 | 8,000 |
| | | average number of epoxy groups in one molecule | 10.5 | 11.3 | 83.4 | 0 | 14.7 | 22.8 |
| | | average number of oxetane ring in one molecule | 0 | 13.4 | 0 | 30.3 | 0 | 21.8 |

Preparation of Fatty Acid-Modified Reaction Product

Preparation Examples 7–10

A reactor equipped with a thermometer, thermostat, stirrer and reflux condenser was charged with fatty acids, epoxy compounds, and optionally catlysts, followed by heating up to 130° C. while introducing nitrogen gas, proceeding the reaction at 130° C. while measuring an acid value on occasion until the acid value shows 1(one) or less and stopping the reaction to obtain reaction products (j) to (m). Compositions obtained by gel permeation chromatagraphy and represented by weight % based on solid content of the reaction product in respective reaction products and viscosities of respective reaction products are shown in the following Table 2. Epoxy equivalents of fatty acid-modified epoxy compounds having aliphatic hydrocarbon group due to fatty acids and epoxy group in one molecule, and contained in respective reaction products are shown in the following Table 2.

Preparation Examples 11 and 12

A reactor equipped with a thermometer, thermostat, stirrer, reflux condenser and dropping apparatus was charged with epoxy compounds and catalysts as shown in the following Table 2, followed by heating up to 130° C. while introducing nitrogen gas, and dropping thereinto 80% fatty acid solution prepared by adding 25 parts of toluene to 100 parts of fatty acid from the dropping apparatus over 2 hours at that temperature. The completion of the dropping procedure was followed by proceeding the reaction at 130° C. while measuring an acid value on occasion until the acid value shows 1(one) or less and stopping the reaction. Thereafter, the toluene was removed by vacuum distillation, followed by cooling to obtain reaction products (n) and (p), compositions obtained by gel permeation chromatography and represented by weight % based on solid content of the reaction product in respective reaction products and viscosities of respective reaction products are shown in the following Table 2. Epoxy equivalents of fatty acid-modified epoxy compounds having aliphatic hydrocarbon group due to fatty acids and epoxy group in one molecule, and contained in respective reaction products are shown in the following Table 2.

In Table 2, Epolead GT302 is a trade name of a trifunctional alicyclic epoxy resin marketed by Daicel Chemical Industries, Ltd.

procedure was followed by aging at 110° C. for 2 hours to complete the reaction. Thereafter, the interior of the reactor was vacuumed by use of a vacuum pump to remove the

TABLE 2

|  |  |  |  | Preparation Examples | | | | | |
|---|---|---|---|---|---|---|---|---|---|
|  |  |  |  | 7 | 8 | 9 | 10 | 11 | 12 |
| Epoxy compound | neopentylglycol diglycidyl ether | | | 100 | | | | 100 | |
|  | 3,4-epoxycylohexylmethyl-3,4-epoxycyclohexane carboxylate | | | | 100 | 100 | | | |
|  | Epolead GT 302 (*1) | | | | | | 100 | | 100 |
| Fatty acid | oleic acid | | | 100 | | | | 130 | |
|  | coconut oil fatty acid | | | | 25 | | 50 | | 33 |
|  | linseed oil fatty acid | | | | | 56 | | | |
| Catalyst | tetrabutylammonium bromide | | | | 0.1 | 0.01 | | 0.1 | |
|  | tetrabutylphosphonium bromide | | | | | | 0.1 | | 0.05 |
|  | reaction product | | | j | k | l | m | n | p |
| Reaction product | Composition | fatty acid-modified epoxy compound (A-2) | compound having one epoxy group | amount (%) | 73.3 | 44.0 | 61.0 | 30.1 | 92.8 | 22.7 |
|  |  |  | epoxy equivalent | 498 | 461 | 461 | 998 | 498 | 998 |
|  |  |  | compound having two epoxy groups | amount (%) | — | — | — | 63.6 | — | 59.8 |
|  |  |  | epoxy equivalent | — | — | — | 394 | — | 394 |
|  |  | compound modified with fatty acid and not having epoxy group (%) | | 9.5 | 0 | 1.2 | 6.3 | 0 | 0 |
|  |  | unreacted epoxy compound not modified with fatty acid (%) | | 17.2 | 46.0 | 37.8 | 0 | 7.2 | 17.5 |
|  | viscosity of reaction product (Gardner viscosity) | | | Y | W–X | X | T | P | V |

Preparation of Cationically Polymerizable Group-Containing Acrylic Copolymer

Preparation Example 13–15

A reactor equipped with a thermometer, thermostat, stirrer, reflux condenser and dropping apparatus was charged with 67 parts of toluene, followed by heating up to 110° C. while introducing nitrogen gas, dropping thereinto a mixed solution of the monomers and 2,2'-azobis (2-methylbutylonitrile) as a polymerization initiator as shown in the following Table 3 from the above dropping apparatus over 3 hours. The completion of the dropping procedure was followed by aging at 110° C. for 2 hours to complete the reaction. Thereafter, the interior of the reactor was vacuumed by use of a vacuum pump to remove the toluene solvent, resulting in obtaining cationically polymerizable group-containing acrylic copolymer (q) to (s). Glass transition temperatures measured by a differential scanning calorimeter (DSC), number average molecular weights measured by the gel permeation chromatography (GPC) and epoxy equivalent are shown in the following Table 3.

TABLE 3

|  |  | Preparation Examples | | |
|---|---|---|---|---|
|  |  | 13 | 14 | 15 |
| Monomer composition | 3,4-epoxy cyclohexyl acrylate | | | 30 |
|  | 3,4-epoxy cyclohexyl methacrylate | 30 | 30 | |
|  | glycidyl methacrylate | | 20 | |
|  | 3-methacryloxymethyl-3-ethyl oxetane | | | 20 |
|  | styrene | 10 | | 10 |
|  | n-butyl acrylate | 20 | 30 | 20 |
|  | n-butyl methacrylate | 40 | 20 | 20 |
| 2,2'-azobis (2-methylbutylonitrile) | | 4 | 6 | 1 |
| Cationically plymerizable group-containing acrylic copolymer | | q | r | s |
| Property value | resin solid content (%) | 100 | 100 | 100 |
|  | glass transition temperature (° C.) | 20 | 40 | 8 |
|  | number average molecular weight | 4,000 | 3,000 | 10,000 |
|  | epoxy equivalent | 660 | 340 | 607 |

Examples 1–6 and Comparative Examples 1–3

Pigments and cationically polymerizable acrylic resins obtained in respective Preparation Examples according to formulations shown in the following Table 4 were charged into a stirring deaerator, followed by kneading for 10 minutes, and carrying out a pigment dispersion in a three-roll mill to obtain respective pigment dispersion pastes.

Mixtures of respective pigment dispersion pastes obtained as above with other cationically polymerizable binder components and cationic polymerization initiators according to the formulations shown in the following Table 4 were charged into a stirring deaerator respectively, followed by kneading for 3 minutes to obtain respective cationically polymerizable pigmented compositions. Fineness of dispersion and storage stability for respective pigment dispersion pastes obtained in Examples 1–6 and Comparative Examples 1–3 are shown in the following Table 4. (1) Respective cationically polymerizable pigmented compositions obtained in Examples 1–6 and Comparative Examples 1–2 were coated by a roll coater coating method onto the surface of a polyethylene terephthalate film having a thickness of 100 μm to be a film thickness of 5 μm, followed by irradiating ultraviolet light so as to be an irradiation dose of 150 mj/cm² by use of a metal halide lamp, resulting in obtaining respective cured coating films. (2) Respective cationically polymerizable pigmented compositions obtained in Examples 5–6 and Comparative Example 3 were coated by a bar coater coating method onto the surface of an aluminum plate having a thickness of 500 μm to be a film thickness of 8 μm, followed by heating at 180° C. for 30 minutes to obtain respective cured coating films.

Respective cured coating films obtained in the above methods (1) and (2) were subjected to tests of coating film appearance, pencil hardness and surface curing properties according to the following test methods. Test results are shown in the following Table 4.

Examples 7–10 and Comparative Examples 4–5

Respective pigments and resins for pigment dispersion according to the formulations shown in the following Table 5 were charged into a stirring deaerator respectively, followed by kneading for 10 minutes, carrying out pigment dispersion in a three-roll mill to obtain pigment dispersion pastes respectively.

Mixtures of respective pigment dispersion pastes obtained as above with other cationically polymerizable binder components and cationic polymerization initiators according to the formulations shown in the following Table 5 were charged into a stirring deaerator respectively, followed by kneading for 3 minutes to obtain respective cationically polymerizable pigmented compositions. In the case where a starting material to be mixed is a solid, the solid starting material was heated and melted prior to mixing.

Respective cationically polymerizable pigmented compositions were coated by a roll coater coating method onto the surface of a polyethylene terephthalate film having a thickness of 100 μm to be a film thickness of 5 μm, followed by irradiating ultraviolet light so as to be an irradiation dose of 150 mj/cm² by use of a metal halide lamp for curing, resulting in obtaining respective cured coating films.

Examples 11–12 and Comparative Example 6

Pigments and resins for pigment dispersion according to the formulations shown in Table 5 were charged into a stirring deaerator respectively, followed by kneading for 10 minutes, and carrying out pigment dispersion in a three-roll mill to obtain respective pigment dispersion pastes.

Mixtures of respective pigment dispersion pastes obtained as above with other cationically polymerizable binder components and cationic poymerization initiators according to the formulations as shown in Table 5 were charged into a stirring deaerator respectively, followed by kneading for 3 minutes to obtain respective cationically polymerizable pigmented compositions. In the case where a starting material to be mixed is a solid, the solid starting material was heated and melted prior to mixing.

Respective catinically polymerizable pigmented compositions obtained as above were coated by a bar coater coating method onto the surface of an aluminum plate having a thickness of 500 μm to be a film thickness of 8 μm, followed by heating at 180° C. for 30 minutes for curing, resulting in obtaining cured coating films respectively.

Respective pigment dispersion pastes obtained in Examples 7–12 and Comparative Examples 4–6 were subjected to tests for fineness of dispersion and storage stability, and respective cured coating films obtained therein were subjected to tests for coating film appearance, pencil hardness and surface curing properties according to the following test methods. Test results are shown in Table 5.

Test Methods:

Fineness of Pigment Dispersion in the Pigment Dispersion Paste:

The fineness of pigment dispersion in the pigment dispersion paste was determined based on the fineness of dispersion according to a distribution chart method as defined in JIS K-5400 4. 7. 1 (1990), in which a sample was poured into a groove of fineness gauge, a sample layer was made continuous in thickness in the groove, the thickness of layer at a portion where tightly collected grainings began to appear was read out, and it was taken as the target of pigment dispersibility of sample.

Storage Stability of Pigment Dispersion Paste:

A viscosity of a pigment dispersion paste immediately after dispersing (an initial viscosity) and a viscosity after one week's storage at 40° C. (a viscosity after storage) were measured and evaluated according to the following grades.

A viscosity at a shear speed of 100 s$^{-1}$ after structural failure at a shear speed of 20 s$^{-1}$ for 3 minutes was measured by use of cone and plate in a rotating type dynamic viscoelasticity measuring apparatus (marketed by UBM Co., Ltd.).

3: Change in viscosity after storage is less than 10% based on the initial viscosity.

2: Change in viscosity after storage is 10% or more, but less than 30% based on the initial viscosity.

1: Change in viscosity after storage is 30% or more based on the initial viscosity.

Coating Film Appearance:

Smoothness, cracks and glossiness of the coating film were visually observed and evaluated according to the following grades.

3: Coating film shows nothing abnormal, and looks good.

2: Slightly poor in smoothness and glossiness, but no cracks developed.

1: Cracks developed, seriously poor in smoothness or glossiness.

Pencil Hardness:

Pencil hardness test as defined in JIS K-5400 8.4.2 (1990) was carried out, and evaluation due to scratch marks was made.

Surface Curing Properties:

The surface of a cured coating film was rubbed with a gauge impregnated with methyl ethyl ketone under a pressure of about 1 kg/cm² by a reciprocating motion to evaluate glossiness of the coating film surface according to the following grades.

3: Little or no changes in glossiness on the coating film surface were observed by 5 reciprocating motions.

2: Considereable changes in glossiness on the coating film surface were observed by 5 reciprocating motions, but little or no changes in glossiness were observed by 2 reciprocating motions.

1: Considerable changes in glossiness on the coating film surface were observed by one reciprocating motion.

TABLE 4

|  |  |  |  | Examples |  |  |  |  |  | Comparative Ex. |  |  |
|---|---|---|---|---|---|---|---|---|---|---|---|---|
|  |  |  |  | 1 | 2 | 3 | 4 | 5 | 6 | 1 | 2 | 3 |
| Pigment dispersion paste | color pigment | carbon black |  | 30 |  |  |  |  |  | 30 |  |  |
|  |  | azo red |  |  | 50 |  |  | 50 |  |  | 50 |  |
|  |  | titanium white |  |  |  | 100 |  |  | 100 |  |  |  |
|  |  | azo yellow |  |  |  |  | 40 |  |  |  |  | 40 |
|  | cationically polymerizable acrylic resins obtained in Preparation Examples | kind | d | e | g | f | d f | f g | h | i | h |
|  |  | amount | 60 | 40 | 80 | 30 | 55 15 | 20 30 | 40 | 60 | 40 |
| Other cationically polymerizable binder components | alicyclic compound-1 | (*2) | 30 | 30 |  | 40 |  | 25 | 30 | 30 | 30 |
|  | aliphatic compound-2 | (*3) |  | 10 |  |  | 20 |  | 10 |  |  |
|  | Epolead GT300 | (*4) |  |  | 20 |  |  |  |  |  |  |
|  | limonene dioxide |  |  | 20 |  |  | 5 |  | 20 |  |  |
|  | Oxetane compound-3 | (*5) | 10 |  |  | 30 | 5 | 25 |  | 10 | 30 |
| Cationic polymerization initiators | UVI-6990 | (*6) | 5 | 4.5 |  |  |  |  | 16 |  |  |
|  | BBI-102 | (*7) |  |  | 1 | 4 |  |  |  | 3 |  |
|  | SI-180L | (*8) |  |  |  |  | 3 | 2 |  |  | 5 |
| Test results | pigment dispersion paste | fineness of pigment dispersion (μm) | 10> | 10> | 10> | 10> | 10> | 10> | 20 | 30 | 20 |
|  |  | storage stability | 3 | 3 | 3 | 3 | 3 | 3 | 1 | 1 |  |
|  | cured coating film | coating film appearance | 3 | 3 | 3 | 3 | 3 | 3 | 1 | 1 |  |
|  |  | pencil hadness | H | H | 2H | H | 3H | 2H | 2H | HB | 3H |
|  |  | surface curing properties | 3 | 3 | 3 | 3 | 3 | 3 | 2 | 1 | 3 |

In Table 4, (*2) to (*8) mean as follows respectively.

(*2) alicyclic compound-1:3,4-epoxyoyclohexylmethyl 3,4-epoxycyclohexane carboxylate.

(*3) aliphatic compound-2: ethylene glycol diglycidyl ether.

(*4) Epolead GT300: trifunctional alicyclic epoxy resin, trade name, marketed by Daicel Chemical Industries, Ltd.

(*5) oxetane compound-3; 3-ethyl 3-hydroxymethyl oxetane.

(*6) UVI-6990: cationic photopolymerization initiator, trade name "Cyracure UVI-6990", marketed by Union Carbide Co., Ltd., U.S.A.

(*7) BBI-102: diallyliodonium salt-based cationic photopolymerization initiator, trade name, marketed by Midori Kagaku Co., Ltd.

(*8) SI-180L: cationic thermopolymerization initiator, trade name "Sanaid SI-180L", marketed by Sanshin Chemical Ind., Co., Ltd.

TABLE 5

|  |  |  |  | Examples |  |  |  |  |  | Comparative Ex. |  |  |
|---|---|---|---|---|---|---|---|---|---|---|---|---|
|  |  |  |  | 7 | 8 | 9 | 10 | 11 | 12 | 4 | 5 | 6 |
| Pigment dispersion paste | color pigment | carbon black |  | 30 |  |  |  |  |  | 30 |  |  |
|  |  | azo red |  |  | 50 |  |  | 50 |  |  | 50 |  |
|  |  | titanium white |  |  |  | 100 |  |  | 100 |  |  | 100 |
|  |  | azo yellow |  |  |  |  | 40 |  |  |  |  |  |
|  | fatty acid modified reaction products obtained in Preparation Examples | kind | m | k | j | j | l | j |  |  |  |
|  |  | amount | 60 | 80 | 70 | 80 | 60 | 60 |  |  |  |
|  | epoxy group-containing compound | alicyclic compound-1 (*2) |  |  |  |  |  |  | 80 |  |  |
|  |  | aliphatic compound-2 (*3) |  |  |  |  |  |  |  | 60 | 60 |
| acrylic copolymers obtained in Preparation Examples |  | kind | q | q | q | r | s | s | q | q | s |
|  |  | amount | 20 | 20 | 10 | 10 10 | 20 | 10 | 20 | 20 | 10 |
| Other cationically polymerizable compound (A-3) | Other cationically polymerizable compound (A-3)-1(*9) |  | 20 |  | 10 |  |  | 10 |  | 20 | 10 |
|  | Other cationically polymerizable compound (A-3)-2(*10) |  |  |  |  | 10 |  | 20 |  |  | 20 |
| Cationic polymerization initiator (B) | UVI-6990 | (*6) | 5 | 3 |  |  |  |  | 3 | 5 |  |
|  | BBI-102 | (*7) |  |  |  | 2 | 3 |  |  |  |  |
|  | SI-180L | (*8) |  |  |  |  | 2.5 | 5 |  |  | 5 |
| Test results | pigment dispersion paste | fineness of pigment dispersion (μm) | 10> | 10> | 10> | 10> | 10> | 10> | 20 | 35 | 30 |
|  |  | storage stability | 3 | 3 | 3 | 3 | 3 | 3 | 1 | 1 | 2 |
|  | cured coating film | coating film appearance | 3 | 3 | 3 | 3 | 3 | 3 | 1 | 1 | 1 |
|  |  | pencil hardness | HB | H | F | H | 2H | 2H | B | 3B | B |
|  |  | surface curing properties | 3 | 3 | 3 | 3 | 3 | 3 | 2 | 1 | 2 |

In Table 5, (*2), (*3), (*6), (*7) and (*8) are the s; ame as in Table 4, and (*9) and (*10) mean as follows.

(*9) other cationically polymerizable compound (A-3)-1:3-ethyl 3-hydroxymethyl oxetane.

(*10) other cationically polymerizable compound (A-3)-2: neopentyl glycol diglycidyl ether.

What is claimed is:

1. A cationically polymerizable pigmented composition comprising (A) a cationically polymerizable binder component containing at least one resin or compound selected from the group consisting of (A-1) a cationically polymerizable acrylic resin consisting of a copolymer of (a) a (meth)acrylic ester monomer having $C_{6-31}$ aliphatic hydrocarbon group, (b) a polymerizable unsaturated monomer containing a polymerizable unsaturated group and at least one cationically polymerizable moiety selected from the group consisting of an epoxy group and an oxetane ring, and optionally (c) other polymerizable unsaturated monomer, and (A-2) a fatty acid-modified epoxy compound containing $C_{6-32}$ aliphatic hydrocarbon group and epoxy group, (B) a cationic polymerization initiator initiating polymerization by irradiation or heating, and (C) a color pigment.

2. A composition as claimed in claim 1, wherein said cationically polymerizable binder component (A) further contains other cationically polymerizable compound (A-3).

3. A composition as claimed in claim 2, wherein other cationically polymerizable compound (A-3) is at least one compound selected from the group consisting of an epoxy group-containing compound and an oxetane compound.

4. A composition as claimed in claim 2, wherein said cationically polymerizable binder component (A) contains the cationically polymerizable acrylic resin (A-1) and other cationically polymerizable compound (A-3), so that the resin (A-1) is in the range of 10 to 90% by weight and the compound (A-3) is in the range of 10 to 90% by weight based on a total amount thereof.

5. A composition as claimed in claim 2, wherein said cationically polymerizable binder component (A) contains the fatty acid-modified epoxy compound (A-2) and other cationically polymerizable compound (A-3), so that the compound (A-2) is in the range of 10 to 90% by weight and the compound (A-3) is in the range of 10 to 90% by weight based on a total amount thereof.

6. A composition as claimed in claim 1, wherein the cationic polymerization initiator is contained in an amount of 0.1 to 20 parts by weight per 100 parts by weight of the cationically polymerizable binder component (A).

7. A composition as claimed in claim 1, wherein the color pigment (C) is a neutral color pigment or an acid color pigment, and is contained in an amount of 1 to 500 parts by weight per 100 parts by weight of the cationically polymerizable binder component (A).

8. A composition as claimed in claim 1, wherein said monomer (a) as a monomer component of the acrylic resin (A-1) is at least one selected from the group consisting of 2-ethylhexyl (meth)acrylate, isooctyl (meth)acrylate, isodecyl (meth)acrylate, n-lauryl (meth)acrylate, tridecyl (meth)acrylate, isomyristyl (meth)acrylate, n-stearyl (meth) acrylate and isostearyl (meth)acrylate.

9. A composition as claimed in claim 1, wherein said monomer (b) as a monomer component of the acrylic resin (A-1) is at least one selected from the group consisting of glycidyl (meth)acrylate, methylglycidyl (meth)acrylate, allylglycidylether, 3,4-epoxycyclohexylmethyl (meth)acrylate, a compound represented by the following formula (1):

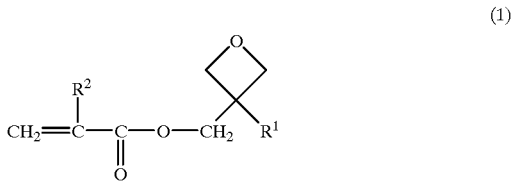

where $R^1$ represents an alkyl group having 1 to 6 carbon atoms, and $R^2$ represents hydrogen atom or methyl group; and a compound prepared by reacting 3-ethyl-3-hydroxymethyl oxetane with 2-isocyanatocthyl (meth)acrylate, m-isopropenyl-α,α-dimethylbenzyl isocyanate or methyl (meth)acrylate.

10. A composition as claimed in claim 1, wherein said fatty acid-modified epoxy compound (A-2) is an epoxy ester compound containing at least one aliphatic hydrocarbon group having 6 to 32 carbon atoms and at least one epoxy group in one molecule, and prepared by partly modifying epoxy groups of an epoxy compound having 2 or more epoxy groups in one molecule and having a number average molecular weight of 140 to 2,000 with a fatty acid having 7 to 33 carbon atoms.

* * * * *